(12) United States Patent
Dreyer

(10) Patent No.: US 11,339,605 B2
(45) Date of Patent: May 24, 2022

(54) OPERATING MODE SETTING FOR AUTOMATIC DOORS

(71) Applicant: ASSA ABLOY ENTRANCE SYSTEMS AB, Landskrona (SE)

(72) Inventor: Roger Dreyer, Bjarred (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 197 days.

(21) Appl. No.: 16/625,851

(22) PCT Filed: Jun. 21, 2018

(86) PCT No.: PCT/EP2018/066512
§ 371 (c)(1),
(2) Date: Dec. 23, 2019

(87) PCT Pub. No.: WO2019/002062
PCT Pub. Date: Jan. 3, 2019

(65) Prior Publication Data
US 2020/0123838 A1   Apr. 23, 2020

(30) Foreign Application Priority Data

Jun. 29, 2017 (SE) .................................. 1730176-3

(51) Int. Cl.
*G07C 9/00* (2020.01)
*G07C 9/22* (2020.01)
(Continued)

(52) U.S. Cl.
CPC .............. *E05F 15/73* (2015.01); *E05F 15/77* (2015.01); *G05B 19/0421* (2013.01);
(Continued)

(58) Field of Classification Search
CPC ........ G07C 9/27; G07C 9/22; G07C 9/00571; G05B 19/0421; G05B 2219/2628
See application file for complete search history.

(56) References Cited

U.S. PATENT DOCUMENTS 7,737,860 B2   6/2010  Banta
9,042,608 B2 *  5/2015  Black ................. G06K 9/00013
                                                        382/116
(Continued)

OTHER PUBLICATIONS

International Search Report and Written Opinion mailed in PCT/EP2018/066512 dated Sep. 14, 2018.
(Continued)

*Primary Examiner* — Daniell L Negron
(74) *Attorney, Agent, or Firm* — Wissing Miller LLP

(57) ABSTRACT

A control arrangement (20) for an entrance system (10) having one or more movable door members (D1 . . . Dm) and an automatic door operator (30) for causing movements of the one or more movable door members (D1 . . . Dm) between closed and open positions is provided. The control arrangement (20) comprising a controller (32) configured to control operation of the automatic door operator (30) in a selected operating mode among a plurality of operating modes. The control arrangement (20) is characterized in that it comprises communication means (58), and the controller (32) is configured to communicate via the communication means (58) with an external computing resource (110) to set the selected operating mode.

6 Claims, 8 Drawing Sheets

(51) Int. Cl.
*G07C 9/27* (2020.01)
*E05F 15/73* (2015.01)
*E05F 15/77* (2015.01)
*G05B 19/042* (2006.01)

(52) U.S. Cl.
CPC ........... G07C 9/00571 (2013.01); G07C 9/22 (2020.01); G07C 9/27 (2020.01); *E05Y 2400/40* (2013.01); *E05Y 2900/132* (2013.01); *G05B 2219/2628* (2013.01)

(56) References Cited

U.S. PATENT DOCUMENTS

| | | |
|---|---|---|
| 2001/0030606 A1 | 10/2001 | Jaffe |
| 2006/0244403 A1* | 11/2006 | Christensson .......... E05F 15/73 318/280 |
| 2012/0023827 A1 | 2/2012 | Hancock |
| 2012/0180390 A1 | 7/2012 | Goodman |
| 2013/0127590 A1 | 5/2013 | Braverman |
| 2014/0258497 A1 | 9/2014 | Kiyomasa |
| 2015/0355828 A1 | 12/2015 | Kiyomasa |
| 2016/0300415 A1 | 10/2016 | Deneen |
| 2017/0175433 A1 | 6/2017 | Kang |

OTHER PUBLICATIONS

Swedish Search Report mailed in SE 1730176-3 dated Jan. 25, 2018.

* cited by examiner

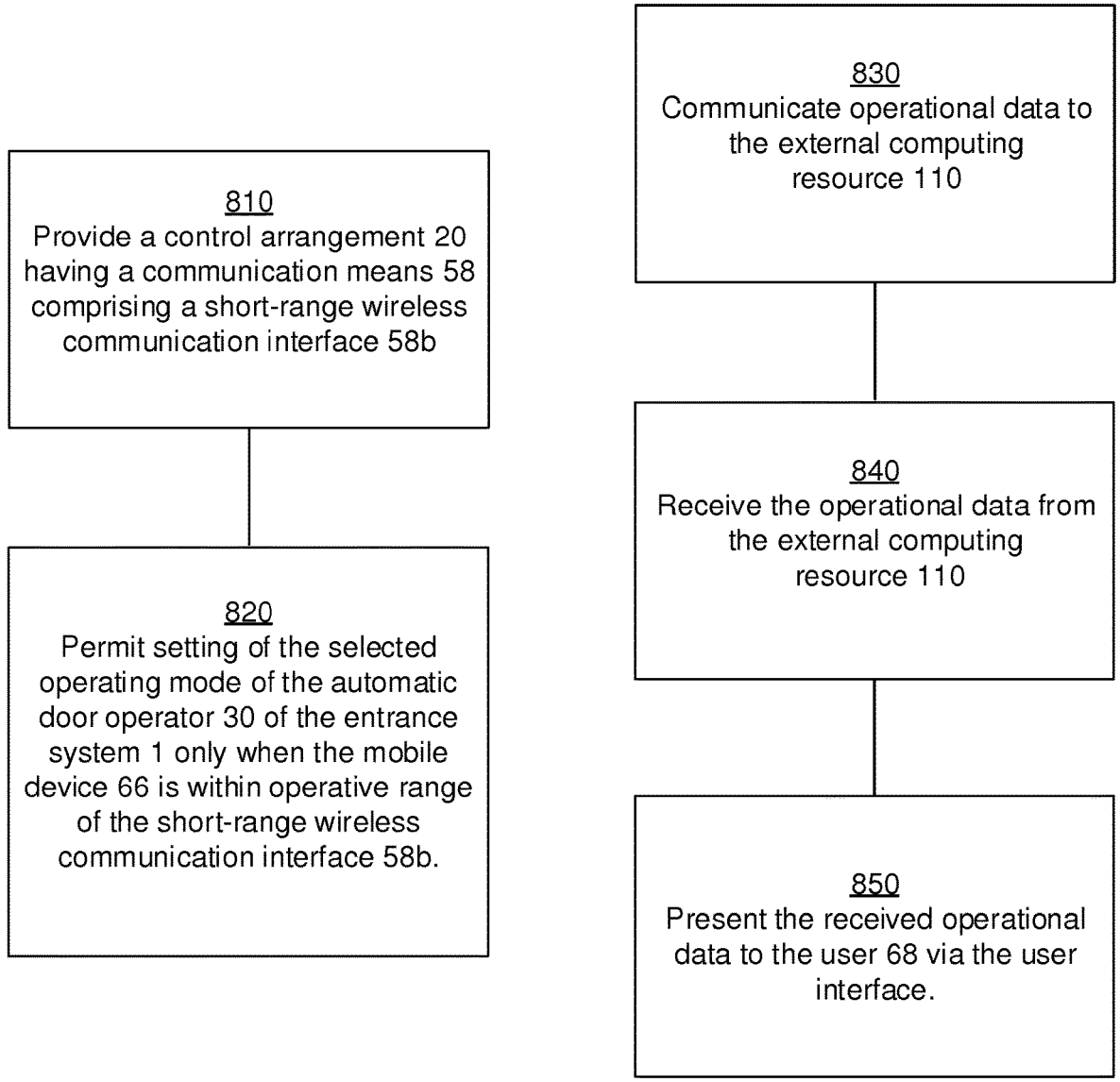

OPERATING MODE SETTING FOR AUTOMATIC DOORS

This application is a 371 of PCT/EP2018/066512 filed on Jun. 21, 2018, published on Jan. 3, 2019 under publication number WO 2019/002062, which claims priority benefits from Swedish Patent Application No. 1730176-3 filed on Jun. 29, 2017, the disclosure of which is incorporated herein by reference.

TECHNICAL FIELD

The present invention relates to the technical field of entrance systems having one or more movable door members. More specifically, the present invention relates to a control arrangement for an entrance system having one or more movable door members and an automatic door operator for causing movements of the one or more movable door members between closed and open positions. The present invention also relates to an entrance system comprising such a control arrangement, to a computerized system and to a method of operating such an entrance system.

BACKGROUND

Entrance systems having automatic door operators are frequently used for providing automatic opening and closing of one or more movable door members in order to facilitate entrance and exit to buildings, rooms and other areas. The door members may for instance be swing doors, sliding door or revolving doors.

Entrance systems having automatic door operators are typically used in public areas during long periods of time and under varying conditions in terms of time of day (e.g. opening hours), time of week (e.g. work days or holidays), time of year (e.g. seasonal variations), passage frequencies, etc. To this end, entrance systems typically have a plurality of different operating modes in which the automatic door operators may be operated. Examples of different operating modes are, without limitation or prejudice, automatic operation, exit operation, forced open operation, forced closed operation, lock door operation, manual operation and summer position operation.

Conventionally, an operator panel is provided at the entrance system, typically in the form of a box which is installed next to the movable door members. A human operator may set the current operating mode by pressing a button on the operator panel.

However, the present inventors have identified problems and shortcomings in this respect. An operator panel box requires space, cabling and installation work, in addition to the fact that the box itself obviously has a cost. In some public areas, it may be difficult to install an operator panel box properly because of space constraints or the surface materials of the public area in question. Also, due to its location in a public area, the operator panel box will be exposed not only to environmental wear and tear, but also to a risk of vandalism, manipulation or usage by unauthorized people.

Accordingly, there is room for improvements in this field.

SUMMARY

An object of the present invention is therefore to provide one or more improvements in the field of entrance systems having automatic door operators for causing movements of one or more movable door members between closed and open positions.

Accordingly, a first aspect of the present invention is a control arrangement for an entrance system having one or more movable door members and an automatic door operator for causing movements of the one or more movable door members between closed and open positions. The control arrangement comprises a controller configured to control operation of the automatic door operator in a selected operating mode among a plurality of operating modes. The control arrangement is characterized in that it comprises communication means and that the controller is configured to communicate via the communication means with an external computing resource to set the selected operating mode.

The provision of such a control arrangement will solve or at least mitigate one or more of the problems or drawbacks identified in the above, as will be clear from the following detailed description section and the drawings.

A second aspect of the present invention is an entrance system comprising one or more movable door members, an automatic door operator for causing movements of the one or more movable door members between closed and open positions, and a control arrangement according to the first aspect of the present invention.

A third aspect of the present invention is a computerized system comprising an entrance system according to the second aspect of the present invention and an external computing resource. The communication means of the control arrangement of the entrance system comprises a wide-area data communication network interface and the external computing resource is a cloud-based computing resource configured to communicate an instruction over a wide-area data communication network to the controller of the control arrangement of the entrance system for setting the selected operating mode of the automatic door operator of the entrance system.

A fourth aspect of the present invention is a method of operating an entrance system having one or more movable door members and an automatic door operator for causing movements of the one or more movable door members between closed and open positions. The method comprises providing an external computing resource, receiving an instruction from the external computing resource and setting an operating mode of the automatic door operator in accordance with the received instruction, the operating mode being selected among a plurality of operating modes.

In different embodiments, the one or more movable door members may, for instance, be swing door members, sliding door members, revolving door members, sectional door members or pull-up door members.

Embodiments of the invention are defined by the appended dependent claims and are further explained in the detailed description section as well as in the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Objects, features and advantages of embodiments of the invention will appear from the following detailed description, reference being made to the accompanying drawings.

FIG. 8A is a flowchart diagram illustrating a method of operating an entrance system generally according to an embodiment.

FIG. 8B is a flowchart diagram illustrating a method of operating an entrance system generally according to an embodiment.

DETAILED DESCRIPTION OF EMBODIMENTS

Figure 1:
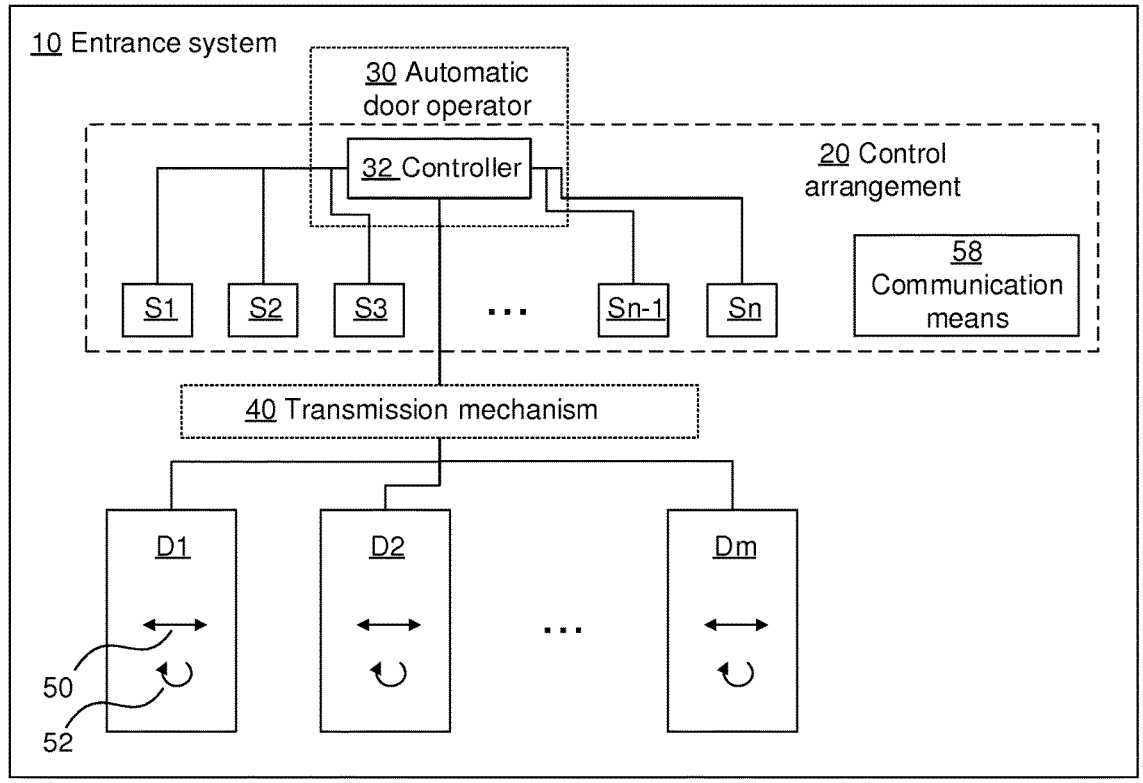
FIG. 1 is a schematic block diagram of an entrance system generally according to the present invention.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Figure 2:
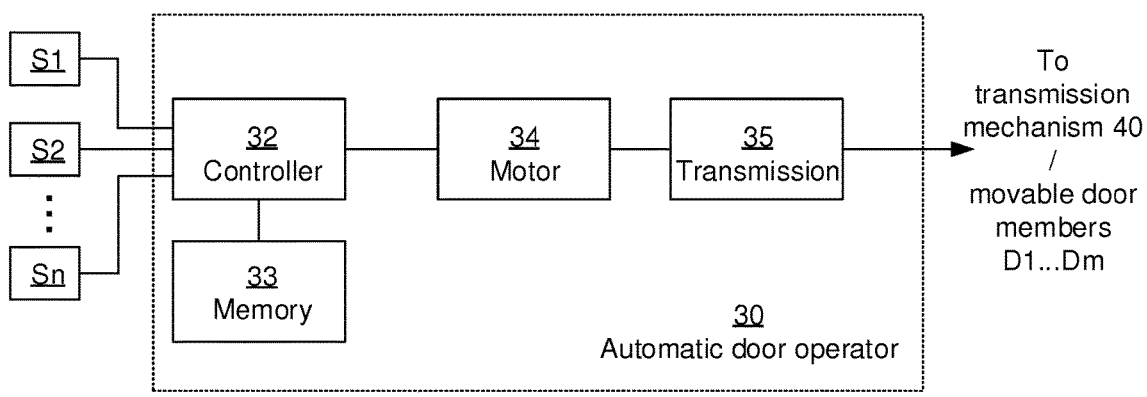
FIG. 2 is a schematic block diagram of an automatic door operator which may be included in the entrance system shown in FIG. 1.

FIG. 1 is a schematic block diagram illustrating an entrance system 10 in which the inventive aspect of the present invention may be applied. The entrance system 10 comprises one or more movable door members D1 . . . Dm, and an automatic door operator 30 for causing movements of the door members D1 . . . Dm between closed and open positions. In FIG. 1, a transmission mechanism 40 conveys mechanical power from the automatic door operator 30 to the movable door members D1 . . . Dm. FIG. 2 illustrates one embodiment of the automatic door operator 30 in more detail.

Pursuant to the invention, a control arrangement 20 is provided for the entrance system 10. The control arrangement 20 comprises a controller 32, which may be part of the automatic door operator 30 as seen in the embodiment of FIG. 2, but which may be a separate device in other embodiments. The control arrangement 20 also comprises a plurality of sensors S1 . . . Sn. Each sensor is connected to the controller 32 by wired connections, wireless connections, or any combination thereof. As will be exemplified in the subsequent description of the three different embodiments in FIGS. 3A, 3B and 3C, each sensor is configured to monitor a respective zone Z1 . . . Zn at the entrance system 10 for presence or activity of a person or object. The person may be an individual who is present at the entrance system 10, is approaching it or is departing from it. The object may, for instance, be an animal or an article in the vicinity of the entrance system 10, for instance brought by the aforementioned individual. Alternatively, the object may be a vehicle or a robot.

Figure 4:
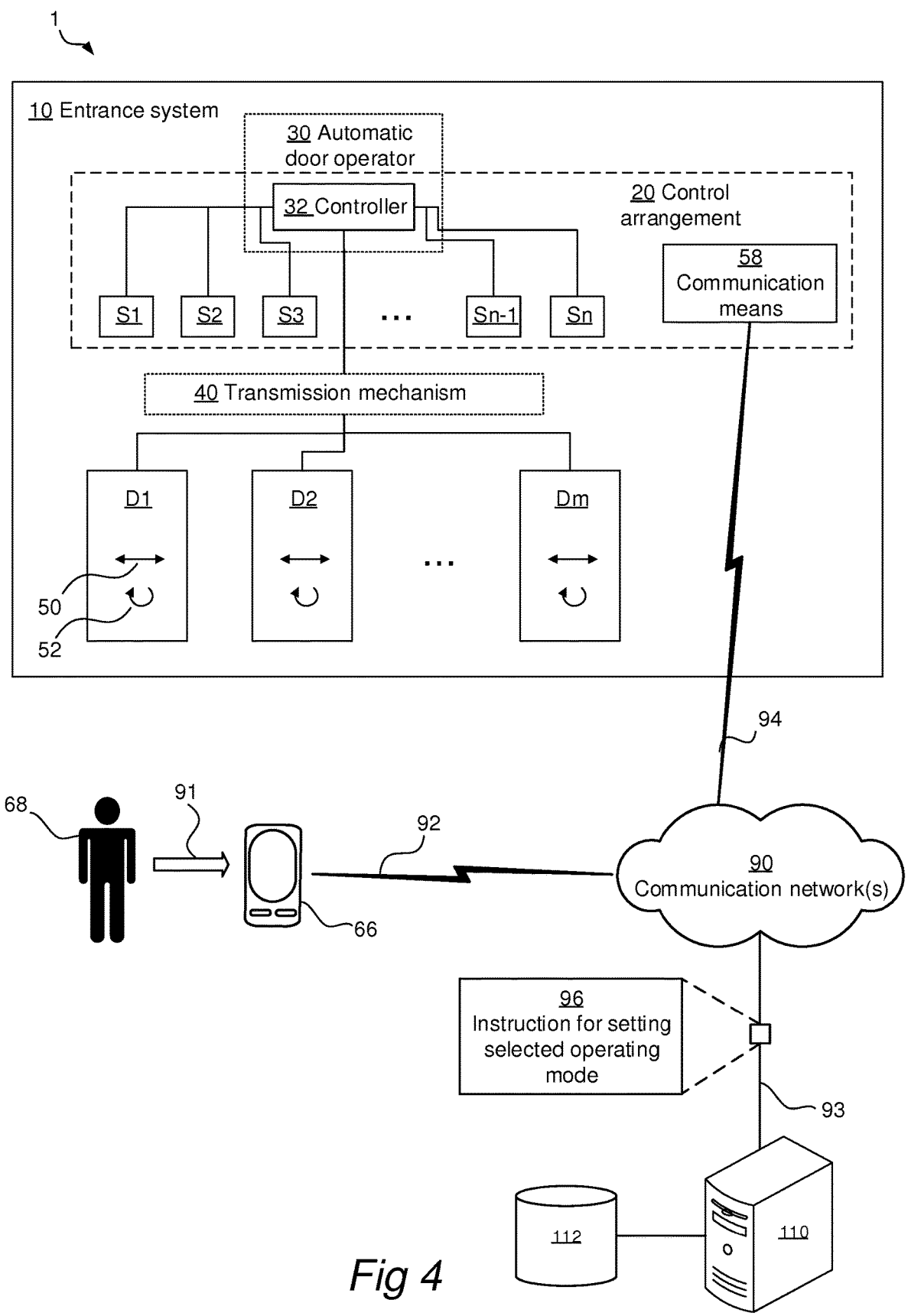
FIG. 4 is a schematic block diagram of a computerized system comprising an entrance system according to an embodiment of the present invention.
Figure 5:
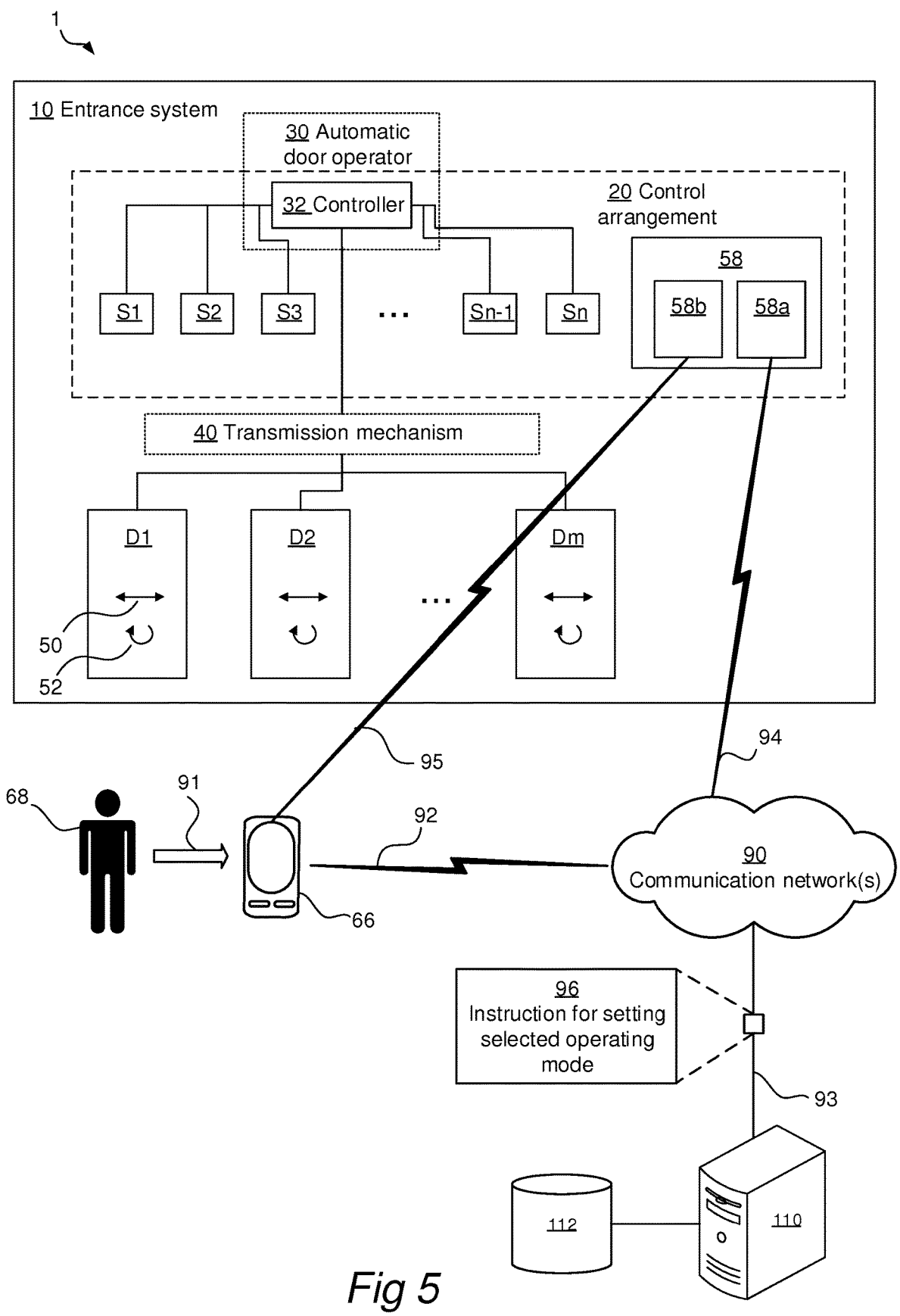
FIG. 5 is a schematic block diagram of a computerized system comprising an entrance system according to an embodiment of the present invention.
Figure 6:
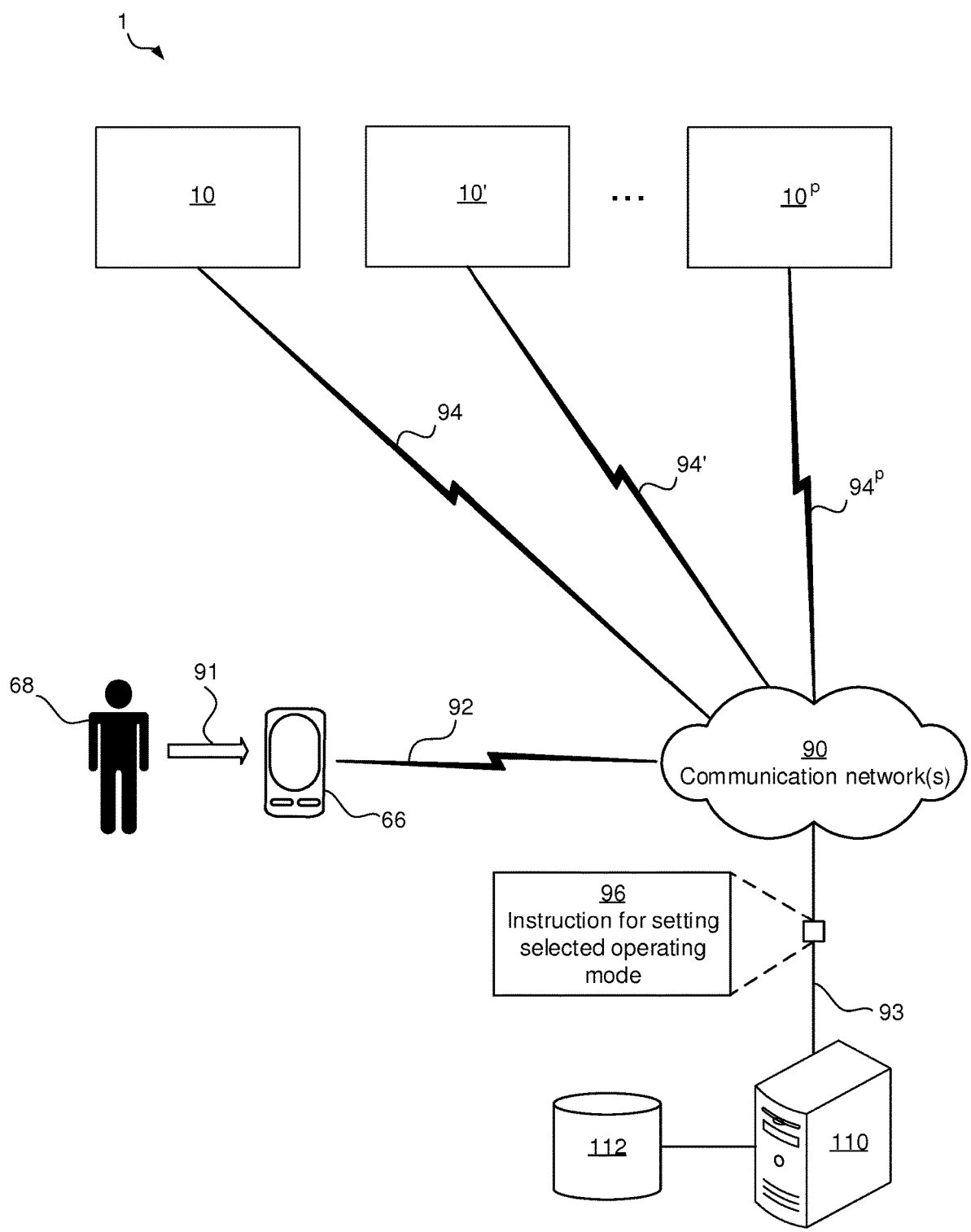
FIG. 6 is a schematic block diagram of a computerized system comprising an entrance system according to an embodiment of the present invention.

The control arrangement 20 further comprises communication means 58 for communicating with an external device 66 and/or an external computing resource 110 (as seen in FIGS. 4-6). The communication means 58 may have a network interface for connecting to one or more communications network(s) 90. The network interface may comply with any commercially available mobile telecommunications standard, including but not limited to GSM, UMTS, LTE, D-AMPS, CDMA2000, FOMA and TD-SCDMA. Alternatively or additionally, the network interface may comply with any commercially available standard for data communication, such as for instance TCP/IP. Alternatively or additionally, the network interface may comply with one or more short-range wireless data communication standards such as Bluetooth®, WiFi (e.g. IEEE 802.11, wireless LAN), Near Field Communication (NFC), RF-ID (Radio Frequency Identification) or Infrared Data Association (IrDA).

Further, the communication means 58 may have a wireless transceiver for interaction with an external device 66. In an advantageous embodiment, the wireless transceiver is capable of short-range wireless data communication such as, for instance, Bluetooth®, WLAN/WiFi, NFC (Near Field Communication), RF-ID (Radio Frequency Identification) or IrDA (Infrared Data Association).

The communication network 58 and its functions will be described more with reference to FIGS. 4-6.

The embodiment of the automatic door operator 30 shown in FIG. 2 will now be described in more detail. The automatic door operator 30 may typically be arranged in conjunction with a frame or other structure which supports the door members D1 . . . Dm for movements between closed and open positions, often as a concealed overhead installation in or at the frame or support structure.

In addition to the aforementioned controller 32, the automatic door operator 30 comprises a motor 34, typically an electrical motor, being connected to an internal transmission or gearbox 35. An output shaft of the transmission 35 rotates upon activation of the motor 34 and is connected to the external transmission mechanism 40. The external transmission mechanism translates the motion of the output shaft of the transmission 35 into an opening or a closing motion of one or more of the door members D1 . . . Dm with respect to the frame or support structure.

The controller 32 is configured for performing different functions of the automatic door operator 30 in the different operational states of the entrance system 10, using inter alia sensor input data from the plurality of sensors S1 . . . Sn. Hence, the outputs of the plurality of sensors S1 . . . Sn are connected to data inputs of the controller 32. At least some of the different functions performable by the controller 32 have the purpose of causing desired movements of the door members D1 . . . Dm. To this end, the controller 32 has at least one control output connected to the motor 34 for controlling the actuation thereof.

The controller 32 may be implemented in any known controller technology, including but not limited to microcontroller, processor (e.g. PLC, CPU, DSP), FPGA, ASIC or any other suitable digital and/or analog circuitry capable of performing the intended functionality.

The controller 32 also has an associated memory 33. The memory 33 may be implemented in any known memory technology, including but not limited to E(E)PROM, S(D) RAM or flash memory. In some embodiments, the memory 33 may be integrated with or internal to the controller 32. The memory 33 may store program instruction for execution by the controller 32, as well as temporary and permanent data used by the controller 32.

Figure 3A:
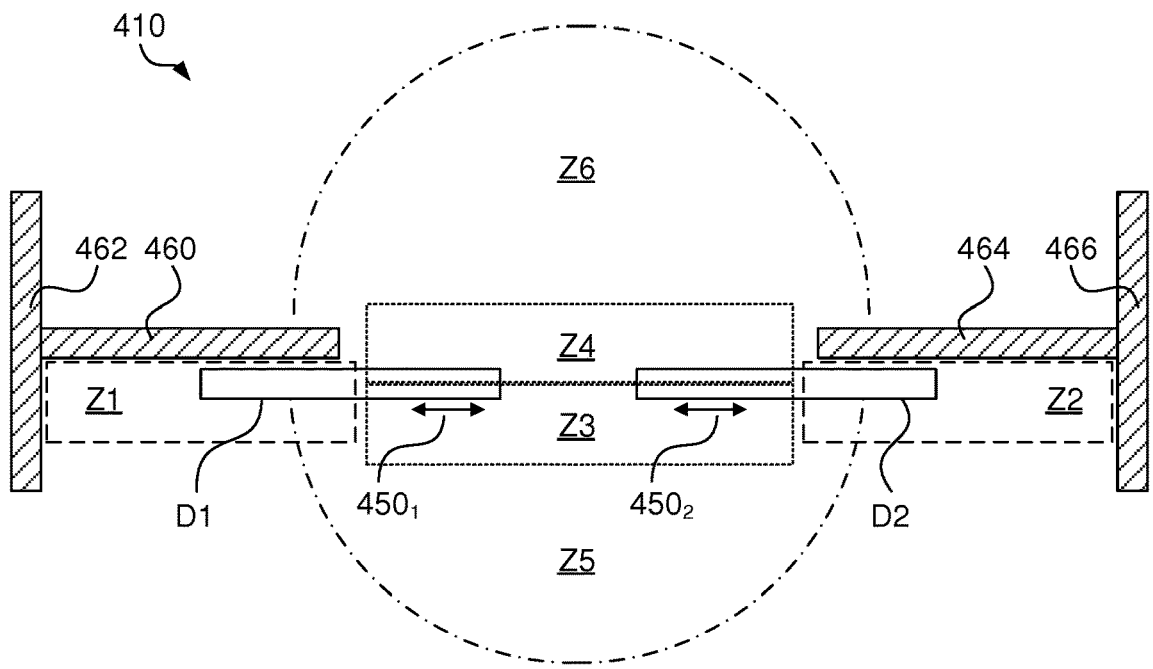
FIG. 3A is a schematic top view of an entrance system according to a first embodiment, in the form of a sliding door system.

Turning now to FIG. 3A, a first embodiment of an entrance system in the form of a sliding door system 410 is shown in a schematic top view. The sliding door system 410 comprises first and second sliding doors or wings D1 and D2, being supported for sliding movements $450_1$ and $450_2$ in parallel with first and second wall portions 460 and 464. The first and second wall portions 460 and 464 are spaced apart; in between them there is formed an opening which the sliding doors D1 and D2 either blocks (when the sliding doors are in closed positions), or makes accessible for passage (when the sliding doors are in open positions). An automatic door operator (not seen in FIG. 3A but referred to as 30 in FIGS. 1 and 2) causes the movements $450_1$ and $450_2$ of the sliding doors D1 and D2.

The sliding door system 410 comprises a plurality of sensors, each monitoring a respective zone Z1-Z6. The sensors themselves are not shown in FIG. 3A, but they are generally mounted at or near ceiling level and/or at positions which allow them to monitor their respective zones Z1-Z6. To facilitate the reading, each sensor will be referred to as Sx in the following, where x is the same number as in the zone Zx it monitors (Sx=S1-S6, Zx=Z1-Z6).

A first sensor S1 is mounted at a lateral position to the far left in FIG. 3A to monitor zone Z1. The first sensor S1 is a side presence sensor, and the purpose is to detect when a person or object occupies a space between the outer lateral edge of the sliding door D1 and an inner surface of a wall or other structure 462 when the sliding door D1 is moved towards the left in FIG. 3A during an opening state of the sliding door system 410. The provision of the side presence sensor S1 will help avoiding a risk that the person or object will be hit by the outer lateral edge of the sliding door D1, and/or jammed between the outer lateral edge of the sliding door D1 and the inner surface of the wall 462, by triggering abort and preferably reversal of the ongoing opening movement of the sliding door D1.

A second sensor S2 is mounted at a lateral position to the far right in FIG. 3A to monitor zone Z2. The second sensor S2 is a side presence sensor, just like the first sensor S1, and has the corresponding purpose—i.e. to detect when a person or object occupies a space between the outer lateral edge of the sliding door D2 and an inner surface of a wall 466 when the sliding door D2 is moved towards the right in FIG. 3A during the opening state of the sliding door system 410.

A third sensor S3 is mounted at a first central position in FIG. 3A to monitor zone Z3. The third sensor S3 is a door presence sensor, and the purpose is to detect when a person or object occupies a space between or near the inner lateral edges of the sliding doors D1 and D2 when the sliding doors D1 are moved towards each other in FIG. 3A during a closing state of the sliding door system 410. The provision of the door presence sensor S3 will help avoiding a risk that the person or object will be hit by the inner lateral edge of the sliding door D1 or D2, and/or be jammed between the inner lateral edges of the sliding doors D1 and D2, by aborting and preferably reversing the ongoing closing movements of the sliding doors D1 and D2.

A fourth sensor S4 is mounted at a second central position in FIG. 3A to monitor zone Z4. The fourth sensor S4 is a door presence sensor, just like the third sensor S3, and has the corresponding purpose—i.e. to detect when a person or object occupies a space between or near the inner lateral edges of the sliding doors D1 and D2 when the sliding doors D1 are moved towards each other in FIG. 3A during a closing state of the sliding door system 410.

The side presence sensors S1 and S2 and door presence sensors S3 and S4 may for instance be active IR (infrared) sensors.

A fifth sensor S5 is mounted at an inner central position in FIG. 3A to monitor zone Z5. The fifth sensor S5 is an inner activity sensor, and the purpose is to detect when a person or object approaches the sliding door system 410 from the inside of the premises. The provision of the inner activity sensor S5 will trigger the sliding door system 410, when being in a closed state or a closing state, to automatically switch to an opening state for opening the sliding doors D1 and D2, and then make another switch to an open state when the sliding doors D1 and D2 have reached their fully open positions.

A sixth sensor S6 is mounted at an outer central position in FIG. 3A to monitor zone Z6. The sixth sensor S6 is an outer activity sensor, and the purpose is to detect when a person or object approaches the sliding door system 410 from the outside of the premises. Similar to the inner activity sensor S5, the provision of the outer activity sensor S6 will trigger the sliding door system 410, when being in its closed state or its closing state, to automatically switch to the opening state for opening the sliding doors D1 and D2, and then make another switch to an open state when the sliding doors D1 and D2 have reached their fully open positions.

The inner activity sensor S5 and the outer activity sensor S6 may for instance be radar (microwave) sensors.

Figure 3B:
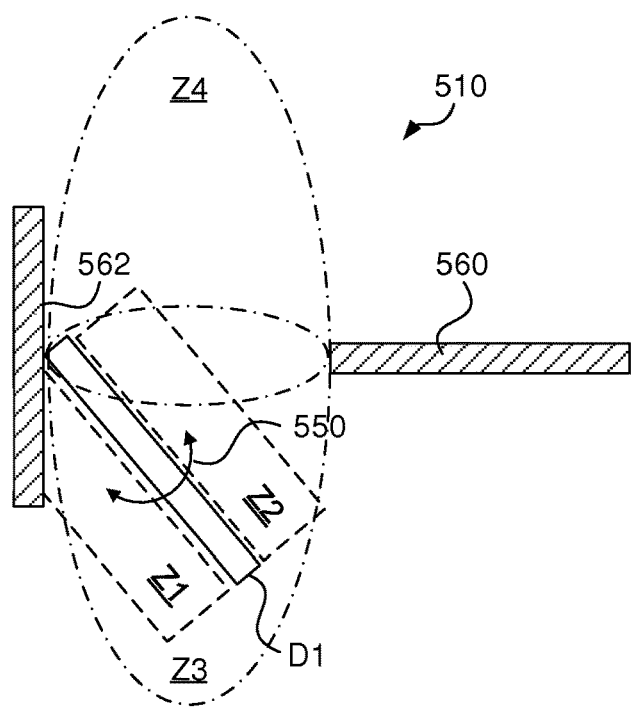
FIG. 3B is a schematic top view of an entrance system according to a second embodiment, in the form of a swing door system.

A second embodiment of an entrance system in the form of a swing door system 510 is shown in a schematic top view in FIG. 3B. The swing door system 510 comprises a single swing door D1 being located between a lateral edge of a first wall 560 and an inner surface of a second wall 562 which is perpendicular to the first wall 560. The swing door D1 is supported for pivotal movement 550 around pivot points on or near the inner surface of the second wall 562. The first and second walls 560 and 562 are spaced apart; in between them an opening is formed which the swing door D1 either blocks (when the swing door is in closed position), or makes accessible for passage (when the swing door is in open position). An automatic door operator (not seen in FIG. 3B but referred to as 30 in FIGS. 1 and 2) causes the movement 550 of the swing door D1.

The swing door system 510 comprises a plurality of sensors, each monitoring a respective zone Z1-Z4. The sensors themselves are not shown in FIG. 3B, but they are generally mounted at or near ceiling level and/or at positions which allow them to monitor their respective zones Z1-Z4. Again, each sensor will be referred to as Sx in the following, where x is the same number as in the zone Zx it monitors (Sx=S1-S4, Zx=Z1-Z4).

A first sensor S1 is mounted at a first central position in FIG. 3B to monitor zone Z1. The first sensor S1 is a door presence sensor, and the purpose is to detect when a person or object occupies a space near a first side of the (door leaf of the) swing door D1 when the swing door D1 is being moved towards the open position during an opening state of the swing door system 510. The provision of the door presence sensor S1 will help avoiding a risk that the person or object will be hit by the first side of the swing door D1 and/or be jammed between the first side of the swing door D1 and the second wall 562; a sensor detection in this situation will trigger abort and preferably reversal of the ongoing opening movement of the swing door D1.

A second sensor S2 is mounted at a second central position in FIG. 3B to monitor zone Z2. The second sensor S2 is a door presence sensor, just like the first sensor S1, and has the corresponding purpose—i.e. to detect when a person or object occupies a space near a second side of the swing door D1 (the opposite side of the door leaf of the swing door D1) when the swing door D1 is being moved towards the closed position during a closing state of the swing door system 510. Hence, the provision of the door presence sensor S2 will help avoiding a risk that the person or object will be hit by the second side of the swing door D1 and/or be jammed between the second side of the swing door D1 and the first wall 560; a sensor detection in this situation will trigger abort and preferably reversal of the ongoing closing movement of the swing door D1.

The door presence sensors S1 and S2 may for instance be active IR (infrared) sensors.

A third sensor S3 is mounted at an inner central position in FIG. 3B to monitor zone Z3. The third sensor S3 is an inner activity sensor, and the purpose is to detect when a person or object approaches the swing door system 510 from the inside of the premises. The provision of the inner activity sensor S3 will trigger the sliding door system 510, when being in a closed state or a closing state, to automatically switch to an opening state for opening the swing door D1, and then make another switch to an open state when the swing door D1 has reached its fully open position.

A fourth sensor S4 is mounted at an outer central position in FIG. 3B to monitor zone Z4. The fourth sensor S4 is an outer activity sensor, and the purpose is to detect when a person or object approaches the swing door system 510 from the outside of the premises. Similar to the inner activity sensor S3, the provision of the outer activity sensor S4 will trigger the swing door system 510, when being in its closed state or its closing state, to automatically switch to the opening state for opening the swing door D1, and then make another switch to an open state when the swing door D1 has reached its fully open position.

The inner activity sensor S3 and the outer activity sensor S4 may for instance be radar (microwave) sensors.

Figure 3C:
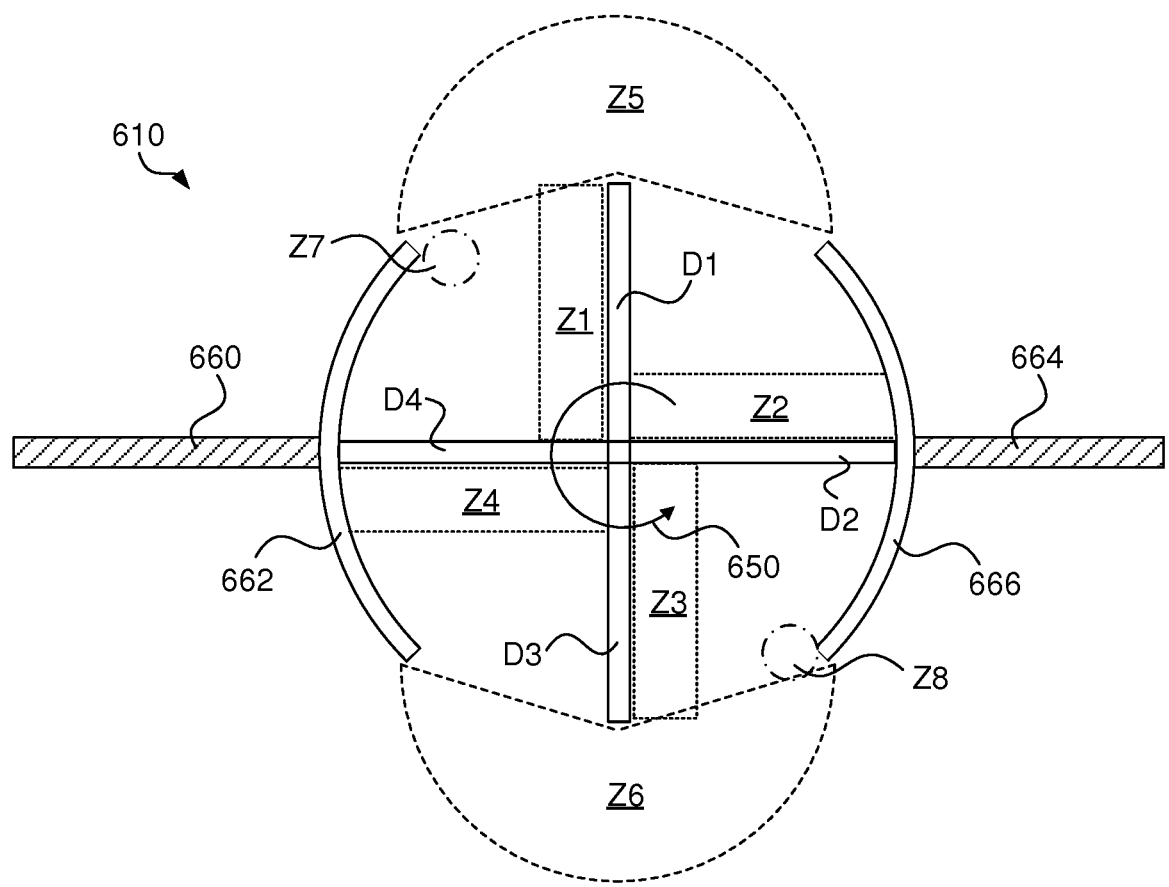
FIG. 3C is a schematic top view of an entrance system according to a third embodiment, in the form of a revolving door system.

A third embodiment of an entrance system in the form of a revolving door system 610 is shown in a schematic top view in FIG. 3C. The revolving door system 610 comprises a plurality of revolving doors or wings D1-D4 being located in a cross configuration in an essentially cylindrical space between first and second curved wall portions 662 and 666 which, in turn, are spaced apart and located between third and fourth wall portions 660 and 664. The revolving doors D1-D4 are supported for rotational movement 650 in the cylindrical space between the first and second curved wall portions 662 and 666. During the rotation of the revolving doors D1-D4, they will alternatingly prevent and allow passage through the cylindrical space. An automatic door operator (not seen in FIG. 3C but referred to as 30 in FIGS. 1 and 2) causes the rotational movement 650 of the revolving doors D1-D4.

The revolving door system 610 comprises a plurality of sensors, each monitoring a respective zone Z1-Z8. The sensors themselves are not shown in FIG. 3C, but they are generally mounted at or near ceiling level and/or at positions which allow them to monitor their respective zones Z1-Z8. Again, each sensor will be referred to as Sx in the following, where x is the same number as in the zone Zx it monitors (Sx=S1-S8, Zx=Z1-Z8).

First to fourth sensors S1-S4 are mounted at respective first to fourth central positions in FIG. 3C to monitor zones Z1-Z4. The first to fourth sensors S1-S4 are door presence sensors, and the purpose is to detect when a person or object occupies a respective space (sub-zone of Z1-Z4) near one side of the (door leaf of the) respective revolving door D1-D4 as it is being rotationally moved during a rotation state or start rotation state of the revolving door system 610. The provision of the door presence sensors S1-S4 will help avoiding a risk that the person or object will be hit by the approaching side of the respective revolving door D1-D4 and/or be jammed between the approaching side of the respective revolving door D1-D4 and end portions of the first or second curved wall portions 662 and 666. When any of the door presence sensors S1-S4 detects such a situation, it will trigger abort and possibly reversal of the ongoing rotational movement 650 of the revolving doors D1-D4.

The door presence sensors S1-S4 may for instance be active IR (infrared) sensors.

A fifth sensor S5 is mounted at an inner non-central position in FIG. 3C to monitor zone Z5. The fifth sensor S5 is an inner activity sensor, and the purpose is to detect when a person or object approaches the revolving door system 610 from the inside of the premises. The provision of the inner activity sensor S5 will trigger the revolving door system 610, when being in a no rotation state or an end rotation state, to automatically switch to a start rotation state to begin rotating the revolving doors D1-D4, and then make another switch to a rotation state when the revolving doors D1-D4 have reached full rotational speed.

A sixth sensor S6 is mounted at an outer non-central position in FIG. 3C to monitor zone Z6. The sixth sensor S6 is an outer activity sensor, and the purpose is to detect when a person or object approaches the revolving door system 610 from the outside of the premises. Similar to the inner activity sensor S5, the provision of the outer activity sensor S6 will trigger the revolving door system 610, when being in its no rotation state or end rotation state, to automatically switch to the start rotation state to begin rotating the revolving doors D1-D4, and then make another switch to the rotation state when the revolving doors D1-D4 have reached full rotational speed.

The inner activity sensor S5 and the outer activity sensor S6 may for instance be radar (microwave) sensors.

Seventh and eighth sensors S7 and S8 are mounted near the ends of the first or second curved wall portions 662 and 666 to monitor zones Z7 and Z8. The seventh and eighth sensors S7 and S8 are vertical presence sensors. The provision of these sensors S7 and S8 will help avoiding a risk that the person or object will be jammed between the approaching side of the respective revolving door D1-D4 and an end portion of the first or second curved wall portions 662 and 666 during the start rotation state and the rotation state of the revolving door system 610. When any of the vertical presence sensors S7-S8 detects such a situation, it will trigger abort and possibly reversal of the ongoing rotational movement 650 of the revolving doors D1-D4.

The vertical presence sensors S7-S8 may for instance be active IR (infrared) sensors.

The entrance system 10 in any of the embodiments described above have a plurality of different operating modes in which the automatic door operator 30 may be operated.

In prior art systems, an operator panel is provided at the entrance system, typically in the form of a box which is installed next to the movable door members. A user may set the current operating mode by pressing a button on the operator panel. As stated in the background section, an operator panel box requires space, cabling and installation work, in addition to the fact that the box itself obviously has a cost. In some public areas, it may be difficult to install an operator panel box properly because of space constraints or the surface materials of the public area in question. Also, due to its location in a public area, the operator panel box will be exposed not only to environmental wear and tear, but also to a risk of vandalism, manipulation or usage by unauthorized people.

According to the inventive concept, as will be described more in detail with reference to FIG. 4-7, the user may set the current operating mode wirelessly by using an external device 66 to communicate with the controller 32 of the control arrangement 20 over a suitable wireless interface or over a data network. Hence, no operator panel is needed thus eliminating or at least migrating the problems described above.

One operating mode may be a first automatic operating mode in which the controller 32 controls the automatic door operator 30 to cause movements of the one or more movable door members D1 . . . Dm based on sensor input data from the plurality of sensors S1 . . . Sn, allowing bidirectional passage through the entrance system 10. Hence, people are allowed both to walk into and/or exit an area through the entrance system 10. The passage will in the following be referred to a passage of people. However as would be readily understood by a person skilled in the art, the entrance system described herein may also be used for passage of animals, vehicles, robots or the like.

Another operating mode may be second automatic operating mode in which the controller 32 controls the automatic door operator 30 to cause movements of the one or more movable door members D1 . . . Dm based on sensor input data from the plurality of sensors S1 . . . Sn, allowing unidirectional passage through the entrance system 10. This mode may be also be referred to as Exit (Automatic Exit Only), in which the entrance system 10 is operated in a situation in which all people shall leave the premises where the entrance system is installed, for instance when a shopping mall closes for the day, or when an escape situation has occurred An additional operation mode may be a first forced-position operating mode in which the controller 32 controls the automatic door operator 30 to cause the one or more movable door members D1 . . . Dm to remain in steady open positions, allowing bidirectional passage through the entrance system 10. This mode may also be referred to as Open, in which all the movable door members D1 . . . Dm take steady open positions not involving movements of the door members D1 . . . Dm by the automatic door operator. This mode may for example be beneficial during the summer in hot weather conditions where it may be desirable to ventilate.

A further operating mode may be a second forced-position operating mode in which the controller 32 controls the automatic door operator 30 to cause the one or more movable door members D1 . . . Dm to remain in steady closed positions, prohibiting passage through the entrance system. This mode, also referred to as Lock Door, may for example be used when no people are allowed into the premises where the entrance system is installed, for instance when a shopping mall is closed for the day.

Yet another operating mode may be a manual operating mode in which the controller 32 controls the automatic door operator 30 to allow manual movement of the one or more movable door members D1 . . . Dm.

As is readily understood by those skilled in the art, other operating modes than those described herein could be used in the inventive concept.

Now turning to FIG. 4, a computerized system 1 is shown. The computerized system 1 comprises an entrance system 10 as described herein, an external computing resource 110 and an external device 66. As soon will be described, the entrance system 10 is in communication with one or several communication network(s) 90, the external device 66 and/or the external computing resource 110.

The external computing resource 110 is preferably a cloud-based computing resource. The term external computing resource may refer to include software and hardware components that are accessible over a network. Some non-limiting examples of a computing resource may include software (such as applications, file utilities, etc.), storage resources (for example, disk drives, magnetic tapes, etc.), network resources, memory resources, processing resources, and the like. The external computing resource 110 may further be in communication with an associated database 112. The associated database 112 may for example be responsible for saving operational data and/or saving user credentials, as will be described more in the following.

The external device 66 may be a mobile terminal such as a mobile phone or a tablet computer, a portable computer or any other portable electronic device that the user 68 is carrying. The external device 66 comprises a display, which may be a non-touch display or a touch-sensitive display. In the following, the display will be referred to as a touch-sensitive display that acts both as a display means and as an input means, thereby forming a user interface.

The external device 66 may have a network interface for connecting to one or more communications network(s) 90, to the external computing resource 110 and/or to connect to the controller 32 of the control arrangement 20 of the entrance system 10. The network interface may comply with any commercially available mobile telecommunications standard, including but not limited to GSM, UMTS, LTE, D-AMPS, CDMA2000, FOMA and TD-SCDMA. Alternatively or additionally, the network interface may comply with one or more short-range wireless data communication standards such as Bluetooth®, WiFi (e.g. IEEE 802.11, wireless LAN), Near Field Communication (NFC), RF-ID (Radio Frequency Identification) or Infrared Data Association (IrDA).

The external device 66 may further have a control unit being responsible for general device operations. Any commercially available central processing unit (CPU) or digital signal processor (DSP), or other programmable electronic logic device such as an application-specific integrated circuit (ASIC) or field-programmable gate array (FPGA), may be used to implement the control unit.

Additionally, the external device 66 may have a memory which is operatively connected to the control unit of the external device. The memory may be implemented by any known memory technology, including but not limited to E(E)PROM, S(D)RAM and flash memory, and it may also include secondary storage such as a magnetic or optical disc. Physically, the memory may consist of one unit or a plurality of units, which together constitute the memory on a logical level.

The external device 66 further comprises a user interface (e.g. the aforementioned touch-sensitive display) that is configured to receive an operating mode setting command 91 by a user 68 via the user interface. The operating mode setting command 91 represents the chosen operating mode and is generated once the user 68 selects an operating mode in the user interface of the display. The display may for example list a number of available operating modes which the user may choose from.

As seen in FIG. 4, the mobile device 66 is configured to cause the external computing resource 110 to communicate an instruction 96 for setting the selected operating mode of the automatic door operator 30 of the entrance system 10. This is triggered by a client-side application ("app") in the mobile device 66 communicating with a server-side application in the external computing resource 110 over the communication network(s) 90, as seen at 92 and 93 in FIG. 4.

In response, the external computing resource 110 is configured to communicate the instruction 96 to the controller 32 of the control arrangement 20 of the entrance system 10 for setting the selected operating mode of the automatic door operator 30. The instructions 96 comprises information relating to the selected operating mode. The instruction 96 is transmitted over the communication network(s) 90 to the controller 32 of the control arrangement 20, via the communication means 58, as seen at 94 in FIG. 4.

In a preferred embodiment, the communication network 90 is a wide-area data communication network 90. As already described with reference to FIG. 1, the communication means 58 of the control arrangement 20 comprises at least a wide-area data communication network interface 58*a* in order to be able to communicate with the external computing resource 110.

It may be beneficial to restrict the access to the control arrangement 20 of the entrance system 10 so that only certain users, such as authorized personnel, may be able to change the operating mode. If the entrance system 10 is arranged in a store, it may for example be beneficial that all the store personnel have access to change the operating mode while the customers visiting the shop are refused access.

Hence, in some embodiments the external computing resource 110 is further configured to require verification of user credentials of the user 68 of the external device 66 in order to communicate the instruction 96 for setting the selected operating mode of the automatic door operator 30. The verification of the user credentials may be done automatically or manually by the user. The user may for example log into a specific account in the server-side application on the external computing resources 110. The allowed user credentials may be saved in the external computing resource 110 and/or in its associated database 112. Alternatively, verification may be done by a trusted third-party service provided on the Internet. The user may receive feedback on a successful or unsuccessful verification of the user credentials.

Providing feedback to the user of operational data of the entrance system 10 may in some case be valuable. The operational data may for example pertain to usage statistics about the entrance system 10 such as the number of openings of the door members D1 . . . Dm, the number of changes of operating mode, passage count, etc. Additionally, or alternatively, the operational data may pertain to an indication of a need for maintenance or repair of the entrance system 10.

The controller 32 of the control arrangement 20 of the entrance system 10 may hence be configured to communicate operational data to the external computing resource 110. The operational data may be save in the associated database 112. The external computing resource 110 may compute statistics and/or transmit unprocessed data to the mobile device 66. The mobile device 66 may be configured to receive the operational data from the external computing resource 110, and present the received operational data to the user via the user interface in the display of the mobile device 66.

FIG. 5 shows another embodiment of a computerized system 1. In addition to what has been described with reference to FIG. 4, the mobile device 66 is also able to communicate directly with the communication means 58 of the control arrangement 20 of the entrance system 10. In order to achieve the respective communication with the mobile device 66 and the external computing resource 110, the communication means 58 of the control arrangement 20 comprises a short-range wireless communication interface 58*b* and a wide-area data communication network interface 58*a*.

The short-range wireless communication interface 58*b* is used to communicate directly with the mobile device 66. This communication may be used to permit or deny the selection of operating mode of the automatic door operator 30. In one embodiment, the controller 32 of the control arrangement 20 is configured to permit setting of the selected operating mode of the automatic door operator 30 only when the mobile device 66 is within operative range of the short-range wireless communication interface 58*b*. Hence, if the mobile device 66 is outside of the operative range of the short-range wireless communication interface 58*b* a selection of an operating mode would not be permitted by the controller 32 of the control arrangement 20 of the entrance system 10.

FIG. 6 shows an embodiment of a computerized system 1 comprising a plurality of entrance systems 10 . . . 10$^P$. In embodiments with several entrance systems it may be beneficial for the user 68 to be able to choose different operating modes for the different entrance systems 10 . . . 10$^P$ and/or to choose an operating mode that applies to all entrance systems 10 . . . 10$^P$.

In one embodiment the user 68 is able to choose from one of the plurality of entrance systems 10 . . . 10$^P$ via the user interface of the mobile device 66. The external device 66 is configured to let the user choose one of the plurality of entrance systems 10 . . . 10$^P$ via the user interface and apply the received operating mode setting command 91 to the chosen entrance system. In this way, the operating mode is only applied to the selected entrance system.

The mobile device 66 may also be configured to apply the received operating mode setting command 91 to a plurality of entrance systems 10 . . . 10$^P$. If the computerized system 1 comprises a first and a second entrance system 10, 10', the user may apply the operating mode selection to both the first entrance system 10 and the second entrance system 10', or even all entrance systems 10, 10', 10$^P$.

Figure 7:
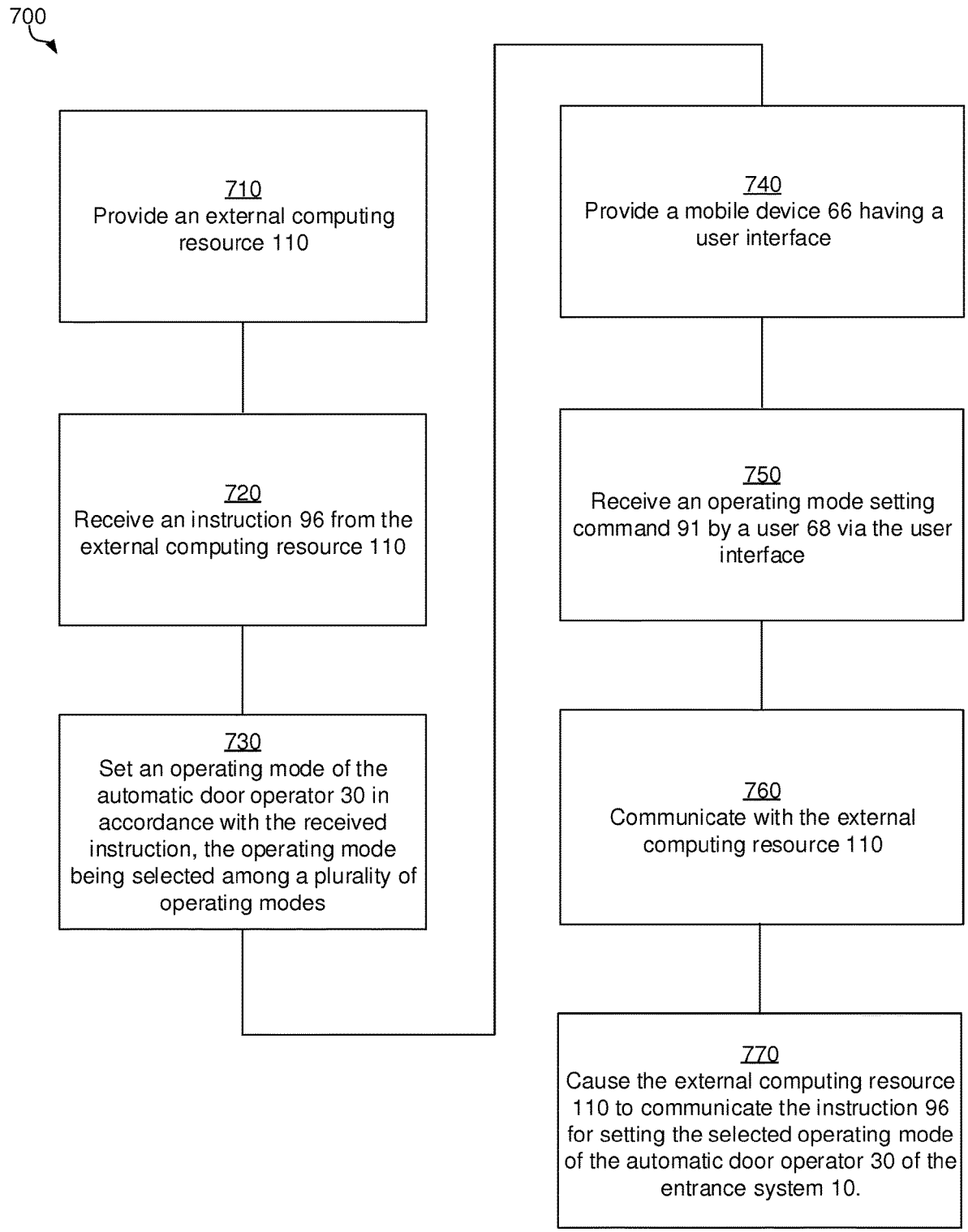
FIG. 7 is a flowchart diagram illustrating a method of operating an entrance system generally according to the present invention.

Reference is made to FIG. 7 which illustrates a method of operating an entrance system 10 involving the inventive functionality.

Hence, in a first step 710, an external computing resource 110 as described herein is provided.

A second step 720 involves receiving an instruction 96 from the external computing resource 110. The operating mode is selected among a plurality of operating modes and the instruction 96 comprises information relating to the selected operating mode.

A third step 730 involves setting an operating mode of the automatic door operator 30 in accordance with the received instruction.

The method may further comprise a fourth step 740 of providing a mobile device 66 having a user interface. The mobile device comprises a display on which the user interface is visible.

In a fifth step 750, an operating mode setting command 91 is received by a user 68 via the user interface of the mobile device 66.

A sixth step 760 involves communicating with the external computing resource 110, and a seventh step 770 step involves causing the external computing resource 110 to communicate the instruction 96 for setting the selected operating mode of the automatic door operator 30 of the entrance system 10.

FIGS. 8A and B illustrates optional method steps of operating an entrance system 10. In one embodiment, as shown in FIG. 8A, the method further involves a first step 810 of providing a control arrangement 20 having a communication means 58 comprising a short-range wireless communication interface 58b. A next step 820 involves permitting setting of the selected operating mode of the automatic door operator 30 of the entrance system 10 only when the mobile device 66 is within operative range of the short-range wireless communication interface 58b.

Additionally or alternatively, as shown in FIG. 8B, the method may further involve the step 830 of communicating operational data to the external computing resource 110. A next step 840 involves receiving the operational data from the external computing resource 110. In a next step 850, the received operational data is presented to the user 68 via the user interface.

The invention has been described above in detail with reference to embodiments thereof. However, as is readily understood by those skilled in the art, other embodiments are equally possible within the scope of the present invention, as defined by the appended claims.

The invention claimed is:

1. A computerized system comprising:
an entrance system comprising one or more movable door members, an automatic door operator for causing movements of the one or more movable door members between closed and open positions, and a control arrangement comprising a controller configured to control operation of the automatic door operator in a selected operating mode among a plurality of operating modes; and
an external computing resource;
wherein the control arrangement further comprises communication means and the controller is configured to communicate via the communication means with the external computing resource to set the selected operating mode;
wherein the communication means of the control arrangement of the entrance system comprises a wide-area data communication network interface;
wherein the external computing resource is a cloud-based computing resource configured to communicate an instruction over a wide-area data communication network to the controller of the control arrangement of the entrance system for setting the selected operating mode of the automatic door operator of the entrance system; and
a mobile device having a user interface,
wherein the mobile device is configured to:
receive an operating mode setting command by a user via the user interface; and
communicate with the external computing resource to cause the external computing resource to communicate the instruction for setting the selected operating mode of the automatic door operator of the entrance system,
wherein the communication means of the control arrangement of the entrance system comprises a short-range wireless communication interface, and
wherein the controller of the control arrangement of the entrance system is configured to permit setting of the selected operating mode of the automatic door operator of the entrance system only when the mobile device is within operative range of the short-range wireless communication interface.

2. The computerized system as defined in claim 1, wherein the external computing resource is configured to require verification of user credentials of the user of the mobile device in order to communicate the instruction for setting the selected operating mode of the automatic door operator of the entrance system.

3. The computerized system as defined in claim 1, wherein the entrance system comprises a first entrance system and a second entrance system;
wherein the mobile device is configured to:
apply the operating mode setting command to both the first entrance system and the second entrance system.

4. The computerized system as defined in claim 1, wherein the controller of the control arrangement of the entrance system is configured to communicate operational data to the external computing resource, and wherein the mobile device is configured to receive the operational data from the external computing resource and present the operational data to the user via the user interface.

5. The computerized system as defined in claim 4, wherein the operational data pertains to at least one of usage statistics about the entrance system and an indication of a need for maintenance or repair of the entrance system.

6. A computerized system comprising:
a first entrance system comprising one or more movable door members, a first automatic door operator for causing movements of the one or more movable door members between closed and open positions, and a first control arrangement comprising a first communication means and a first controller configured to control operation of the first automatic door operator in a selected operating mode among a plurality of operating modes;
a second entrance system comprising one or more movable door members, a second automatic door operator for causing movements of the one or more movable door members between closed and open positions, and a second control arrangement comprising a second communication means and a second controller configured to control operation of the second automatic door operator in a selected operating mode among a plurality of operating modes;
an external computing resource; and
a mobile device having a user interface;
wherein the first and second controller is configured to communicate via respective one of the first and second communication means with the external computing resource to set the selected operating mode of respective one of the first and second automatic door operator;

wherein the external computing resource is a cloud-based computing resource configured to communicate an instruction to the first and second controller for setting the selected operating mode of the respective one of the first and second automatic door operator; and wherein the mobile device is configured to:
  let a user choose one of the first entrance system and the second entrance system via the user interface;
  receive an operating mode setting command from the user via the user interface;
  communicate with the external computing resource to cause the external computing resource to communicate the instruction for setting the selected operating mode of the respective one of the first and second automatic door operator; and
  apply the operating mode setting command to one of the first entrance system and the second entrance system.

* * * * *